Patented Sept. 19, 1922.

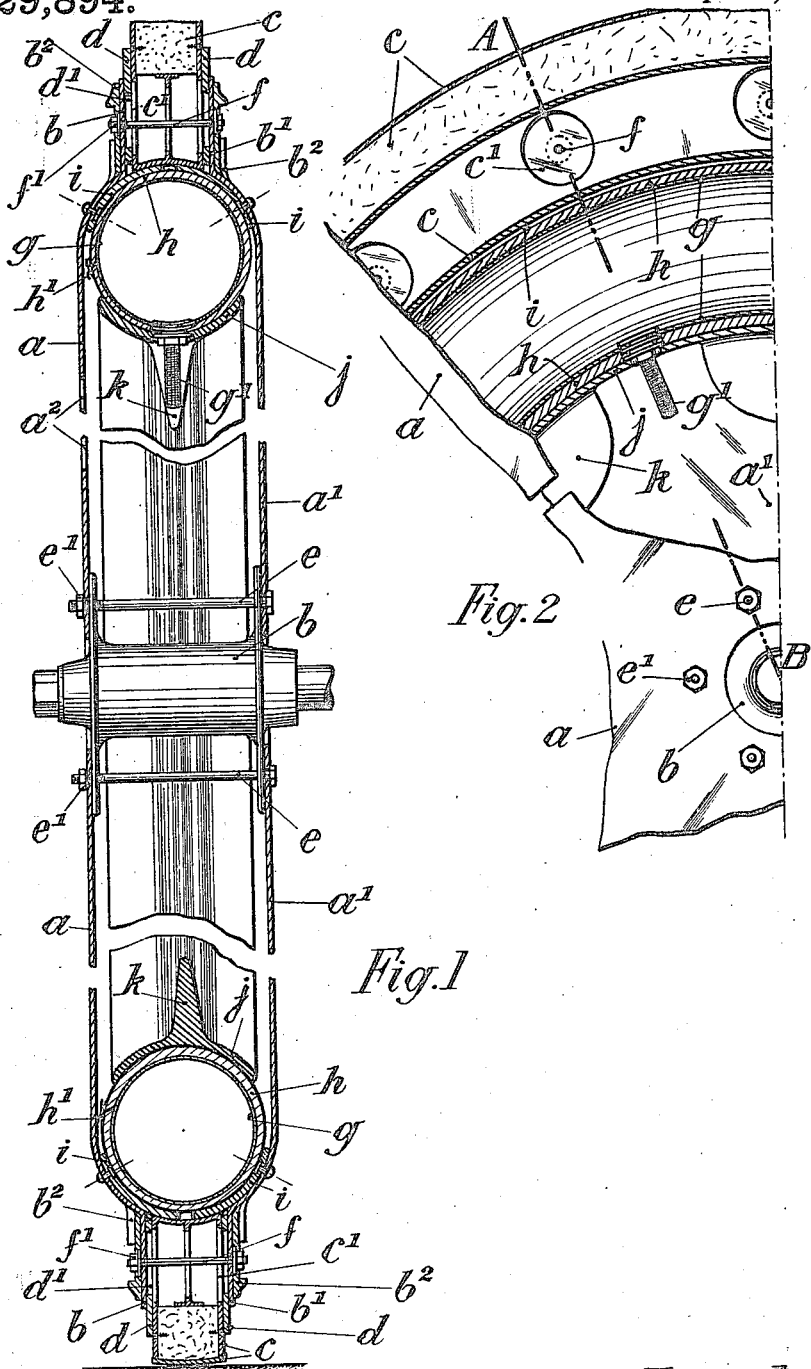

1,429,894

UNITED STATES PATENT OFFICE.

GEORGES LENTZ, DECEASED, LATE OF PONTOISE, FRANCE, BY PAUL DENIZOT, ADMINISTRATOR, OF PONTOISE, FRANCE.

PNEUMATIC WHEEL FOR VEHICLES.

Application filed March 31, 1921. Serial No. 457,486.

(GRANTED UNDER THE PROVISIONS OF THE ACT OF MARCH 3, 1921, 41 STAT. L., 1313.)

*To all whom it may concern:*

Be it known that GEORGES LENTZ, late a citizen of France, deceased, and of whose estate I, PAUL DENIZOT, a citizen of France, and a resident of Pontois, France, have been appointed administrator, has invented a new and useful Improvement in Pneumatic Wheels for Vehicles (for which I have filed applications in France May 12, 1919, Patent No. 499,413, and in Germany application No. 50,864, 11/63b, July 3, 1920, and in Great Britain application No. 18,899, July 6, 1920, and in Belgium application No. 230,817, July 3, 1920, and in Italy application No. 292/2208, June 26, 1920, and in Spain application No. 901, July 6, 1920), of which the following is a specification.

This invention consists in a wheel for vehicles in which the pneumatic cushion for deadening the shocks is inside the wheel and receives the shocks through a tread band or treading circle, thus being protected against injurious external actions and not liable to become punctured. The pneumatic cushion is remote from the hub of the wheel and near the periphery of the latter and so works in the most favourable conditions for resiliency.

The improved wheel comprises an air chamber mounted on a loose rim and placed between two lateral concave plates or disks which limit its outward movement and an external treading circle, which is itself maintained laterally and guided by extensions of the above said plates or disks and acts directly on the periphery of said air chamber. Means are provided to allow of inspecting the air chamber and of readily replacing the treading surface when necessary.

The drawing shows one manner of applying the invention. Fig. 1 is a cross section of a wheel constructed according thereto, made through the line A—B of Fig. 2. Fig 2 is a partial side elevation and partial section of same, one of the lateral plates being removed in order to show the arrangement of parts.

As shown, the wheel comprises two concave plates or disks $a$ and $a^1$ connected to the hub $b^3$, which latter may be loose or fixed on the axle of the carriage. Said plates are provided with outer extensions $b$ and $b^1$ between which is placed a tread band or treading circle $c$ made of metal, wood, fiber, india-rubber or any suitable material or combination of materials, which can rise and fall. Antifriction washers of bronze or other suitable material may advantageously be placed between the circle $c$ and the internal faces of the extensions $b$, $b^1$. Bolts $e$ with nuts $e^1$ connect said plates to the hub $b^3$, while other bolts $f$ with nuts $f^1$ pass through said plates and through large apertures $c'$, $c^1$ in the treading circle $c$ and washers $d$, which apertures permit of a free play of the treading circle in all directions. Ribbed plates $b^2$ on the extensions $b$, $b^1$ protect the heads of the bolts against external shocks.

In the concave rounded room formed by the plates $a$, $a^1$ near their periphery is lodged an air chamber $g$ surrounded by a leather cover $h$ which may conveniently be laced as shown at $h^1$. Strips of leather $i$ are advantageously fixed to the plates $a$, $a^1$. The air chamber is carried by a rim $j$ provided with a web $k$ in order to stiffen it and can freely play between the plates $a$, $a^1$.

For inflating the air chamber, a valve $g^1$ is provided which can be operated through an aperture $a^2$ in the outer plate $a$.

In working, the lower part of the treading circle $c$, near the soil, tends to compress the air chamber $g$, since the load on the axle of the carriage acts on the upper part of said air chamber through the plates $a$, $a^1$. It results that when the wheel oscillates on account of the unevenness of the road, the treading circle $c$, which is rigid, moves away from the air chamber at the upper part while at the lower part it presses against and deforms the same, at the same time as the concave and rounded part of the lateral plates $a$, $a^1$ presses on the top of said air chamber. Thus the latter is compressed between the lower part of the treading circle and the upper part of the plates $a$, $a^1$, so that the whole of the cushion works to deaden the shocks. Moreover the resiliency is obtained here at the circumference of the wheel, the most favourable circumstance for the absorption of the shocks due to the unevenness of the road.

It will be noticed that, with a wheel under the invention, seeing that the whole weight of the carriage bears on the upper part of the pneumatic cushion through the lateral plates while the cushion reacts on the lower part of the treading circle, the vehicle is very well suspended.

Besides a very good resiliency the pneumatic wheel above described practically avoids every risk of puncture of the air chamber, since the latter is protected against external causes of injury.

It will be easily understood that it suffices to remove one of the lateral plates, preferably the external plate $a$, to have free access to the air chamber $g$ and its cover $h$ or to the treading circle in order to replace it when worn out.

What I claim as my invention and desire to secure by Letters Patent is:

1. A pneumatic vehicle wheel having a hub, concave disks connected thereto, the rounded peripheries of said disks arranged to approach each other, outward extensions located in parallelism on the disks, a tread band loosely mounted between said extensions, said tread band having a series of apertures, bolts carried by the extensions and extending through said apertures, a floating rim positioned between the disks, and an air chamber interposed between said rim and the rounded peripheries of the disks.

2. A pneumatic vehicle wheel having a hub, concave disks connected thereto, the rounded peripheries of said disks arranged to approach each other, outward extensions located in parallelism on the disks, a tread band loosely mounted between said extensions, said tread band having a series of apertures, bolts carried by the extensions and extending through said apertures, a floating rim positioned between the disks, an air chamber having a cover interposed between said rim and the rounded peripheries of the disks, and protecting strips arranged to cooperate with the tread band and cover on the air chamber.

In testimony, that I claim the foregoing as the invention, of the said GEORGES LENTZ, deceased, I have signed my name this 18th day of March, 1921.

PAUL DENIZOT,
*Administrator of said Georges Lentz, deceased.*